(12) United States Patent
Seo et al.

(10) Patent No.: US 11,442,277 B2
(45) Date of Patent: Sep. 13, 2022

(54) MULTI-IMAGE DISPLAY APPARATUS

(71) Applicant: SAMSUNG ELECTRONICS CO., LTD., Suwon-si (KR)

(72) Inventors: Wontaek Seo, Yongin-si (KR); Bongsu Shin, Seoul (KR); Daeho Yang, Suwon-si (KR); Changkun Lee, Seoul (KR); Sunil Kim, Seoul (KR); Geeyoung Sung, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/187,158

(22) Filed: Feb. 26, 2021

(65) Prior Publication Data

US 2022/0082831 A1    Mar. 17, 2022

(30) Foreign Application Priority Data

Sep. 16, 2020    (KR) .................. 10-2020-0119322

(51) Int. Cl.
```
G09G 5/00      (2006.01)
G02B 27/01     (2006.01)
H04N 13/339    (2018.01)
G02B 27/00     (2006.01)
H04N 13/337    (2018.01)
```

(52) U.S. Cl.
CPC ..... *G02B 27/0172* (2013.01); *G02B 27/0093* (2013.01); *H04N 13/337* (2018.05); *H04N 13/339* (2018.05); *G02B 2027/0174* (2013.01); *G02B 2027/0178* (2013.01)

(58) Field of Classification Search
CPC ............ G02B 27/0172; G02B 27/0093; H04N 13/337; H04N 13/339
USPC ......................................................... 345/7
See application file for complete search history.

(56) References Cited

U.S. PATENT DOCUMENTS

| | | |
|---|---|---|
| 8,390,933 B2 | 3/2013 | Tanaka et al. |
| 8,810,481 B2 | 8/2014 | Hayashibe et al. |
| 8,934,160 B2 | 1/2015 | Sun |
| 9,195,068 B2 | 11/2015 | Mizoguchi et al. |
| 10,809,664 B2 | 10/2020 | Seo et al. |
| 2005/0264502 A1* | 12/2005 | Sprague ............... H04N 5/7408 348/E5.145 |
| 2011/0304825 A1* | 12/2011 | Sieler .................. H04N 9/3141 353/20 |
| 2018/0067321 A1 | 3/2018 | Alexander et al. |

(Continued)

FOREIGN PATENT DOCUMENTS

WO    2018151807 A1    8/2018

*Primary Examiner* — Jonathan M Blancha
(74) *Attorney, Agent, or Firm* — Sughrue Mion, PLLC

(57) ABSTRACT

Provided is a multi-image display apparatus including a light source configured to emit light, a spatial light modulator configured to modulate the light emitted by the light source and generate image light, a first optical system configured to deliver the image light through a first light path and a second light path that is not parallel with the first light path, and a second optical system configured to deliver external light and the image light delivered through the second light path to a pupil of a viewer, through a third light path that is not parallel with the second light path, wherein the second optical system includes a steering optical device provided at a crossing point of the second light path and the third light path and configured to be two-axis rotated.

16 Claims, 20 Drawing Sheets

(56) References Cited

U.S. PATENT DOCUMENTS

| | | |
|---|---|---|
| 2018/0129052 A1 | 5/2018 | Morrison |
| 2018/0129053 A1* | 5/2018 | Morrison |
| 2018/0180887 A1* | 6/2018 | Kim ........................ G09G 3/20 |
| 2018/0292660 A1 | 10/2018 | Eastwood |
| 2019/0204601 A1* | 7/2019 | Ha ........................ G02B 27/017 |
| 2019/0324272 A1 | 10/2019 | Seo et al. |
| 2019/0361247 A1 | 11/2019 | Lanman et al. |
| 2020/0088998 A1 | 3/2020 | Shin et al. |
| 2020/0356053 A1 | 11/2020 | Seo et al. |
| 2020/0371356 A1 | 11/2020 | Khan |
| 2020/0371370 A1* | 11/2020 | Ouderkirk ............ G02B 27/283 |

* cited by examiner

MULTI-IMAGE DISPLAY APPARATUS

CROSS-REFERENCE TO RELATED APPLICATION

This application claims priority to Korean Patent Application No. 10-2020-0119322, filed on Sep. 16, 2020 in the Korean Intellectual Property Office, the disclosure of which is incorporated by reference herein in its entirety.

BACKGROUND

1. Field

Example embodiments of the present disclosure relate to a multi-image display apparatus displaying a multi-image, such as an augmented reality (AR) system.

2. Description of Related Art

Recently, with the development of electronic devices and display devices capable of realizing virtual reality (VR), interest in the electronic devices and the display devices capable of realizing VR has increased. Also, as next steps of VR, technologies for realizing augmented reality (AR) and mixed reality (MR) have also been researched.

Unlike VR, in which a complete virtual world is premised, AR relates to a display technique for further increasing the reality effect by displaying virtual objects or information on a real world environment in an overlapping and combined manner. Unlike VR, which has been applied to only a limited field, such as games or virtual experiences, AR may be applied to various real environments. Specifically, AR has drawn the attention as next-generation display technologies that are suitable for a ubiquitous environment or an Internet of Things (IoT) environment. Because AR shows a real world together with additional information such as a virtual world by combining the real world with the additional information (the virtual world), AR may be regarded as an example of MR.

SUMMARY

One or more example embodiments provide a multi-image display apparatus to be applied to realize augmented reality (AR) or mixed reality (MR).

One or more example embodiments also provide a multi-image display apparatus, in which an area to view an image is increased.

Additional aspects will be set forth in part in the description which follows and, in part, will be apparent from the description, or may be learned by practice of example embodiments.

According to an aspect of an example embodiment, there is provided a multi-image display apparatus including a light source configured to emit light, a spatial light modulator configured to modulate the light emitted by the light source and generate image light, a first optical system configured to deliver the image light through a first light path and a second light path that is not parallel with the first light path, and a second optical system configured to deliver external light and the image light delivered through the second light path to a pupil of a viewer, through a third light path that is not parallel with the second light path, wherein the second optical system includes a steering optical device provided at a crossing point of the second light path and the third light path and configured to be two-axis rotated.

The multi-image display apparatus may further include a supporter configured to support a first edge of the steering optical device to be pivoted, an elastic supporter configured to elastically support a second edge opposite to the first edge in a first direction of a first diagonal line, and a first actuator and a second actuator respectively configured to displace a third edge and a fourth edge in a second direction of a second diagonal line crossing the first diagonal line.

The steering optical device may include a half-transmittance mirror configured to reflect half of incident light and transmit a remaining half of the incident light.

The steering optical device may include a polarization beam splitter configured to reflect light having a first linear polarization component and transmit light having a second linear polarization component that is orthogonal to the first linear polarization component, and the first optical system may be configured to provide the first linear polarization component of the image light to the polarization beam splitter.

The second optical system may further include a half-transmittance reflector having a first surface and a second surface that is opposite to the first surface, wherein the first surface is configured to reflect the light reflected from the polarization beam splitter toward the polarization beam splitter and the second surface is configured to transmit the external light toward the polarization beam splitter, and a ¼ wavelength plate provided between the polarization beam splitter and the half-transmittance reflector.

The half-transmittance reflector may include a concave reflector.

The first optical system may be configured to form a real image of the image light between the concave reflector and a focal point of the concave reflector.

The spatial light modulator may include a reflective spatial light modulator configured to reflect and modulate the light emitted by the light source.

The first optical system may include a first beam splitter configured to reflect the first linear polarization component of the light emitted by the light source toward the spatial light modulator and transmit the light of the second linear polarization component modulated and reflected from the spatial light modulator, a second beam splitter provided at a first emission side of the first beam splitter, the second beam splitter being configured to reflect the light of the first linear polarization component toward the second light path and transmit the light of the second linear polarization component, a reflector configured to reflect the light transmitted through the second beam splitter toward the second beam splitter, and a ¼ wavelength plate provided between the second beam splitter and the reflector.

The first optical system may further include a first lens provided between the spatial light modulator and the first beam splitter, a second lens provided between the first beam splitter and the second beam splitter, and a third lens provided at a second emission side of the second beam splitter, wherein the first lens and the second lens include convex lenses and the third lens includes a concave lens.

The first optical system may further include a spatial filter provided adjacent to a focal point of the first lens between the first beam splitter and the second beam splitter.

The spatial light modulator may include a transmissive spatial light modulator configured to transmit and modulate the light emitted by the light source.

The first optical system may further include a second beam splitter configured to reflect the light of the first linear polarization component of the image light emitted by the spatial light modulator toward the second light path and transmit the light of the second linear polarization component, a reflector configured to reflect the light transmitted through the second beam splitter toward the second beam splitter, and a ¼ wavelength plate provided between the second beam splitter and the reflector.

The first optical system may further include a first lens and a second lens provided between the spatial light modulator and the second beam splitter, a spatial filter provided between the first lens and the second lens, and a third lens provided at an emission side of the second beam splitter, wherein the first lens and the second lens include convex lenses and the third lens includes a concave lens.

The steering optical device may include a holographic optical element including a first surface, onto which the image light is incident, which faces the pupil, and at which a hologram optical pattern focusing the image light to the pupil is formed, and a second surface onto which the external light is incident.

The first optical system and the second optical system may be configured to form a Maxwellian view optical system in which image information is focused at one point in the pupil and is emitted onto a retina of the viewer.

According to another aspect of an example embodiment, there is provided a multi-image display apparatus including a light source configured to emit light, a spatial light modulator configured to modulate the light emitted by the light source and generate image light, and a holographic optical element configured to be two-axis rotated, the holographic optical element including a first surface, which faces a pupil of a viewer, and at which a hologram optical pattern focusing the image light to the pupil is formed, and a second surface onto which external light is incident.

The light source may include a laser diode.

According to yet another aspect of an example embodiment, there is provided a multi-image display apparatus including a light source configured to emit light, a spatial light modulator configured to modulate the light emitted by the light source and generate image light, a first optical system configured to deliver the image light through a first light path, a second optical system including a steering optical device configured to be two-axis rotated for steering the image light delivered through the first light path, and to deliver the steered image light through a second light path that is not parallel with the first light path, and a holographic optical element configured to deliver external light and the steered image light to a pupil of a viewer through a third light path, the holographic optical element having a first surface, on which a hologram optical pattern focusing the image light behind the pupil is formed, and a second surface, onto which the external light is incident.

The first optical system may include a beam splitter configured to transmit a first linear polarization component of the light emitted by the light source through the spatial light modulator and reflect light of a second linear polarization component modulated and reflected from the spatial light modulator toward a first emission side, a concave reflector provided at the first emission side of the beam splitter and configured to reflect the light toward the first emission side, a ¼ wavelength plate provided between the first emission side and the concave reflector, and a first lens provided between the beam splitter and the steering optical device, wherein the second optical system includes a second lens provided between the steering optical device and the holographic optical element.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
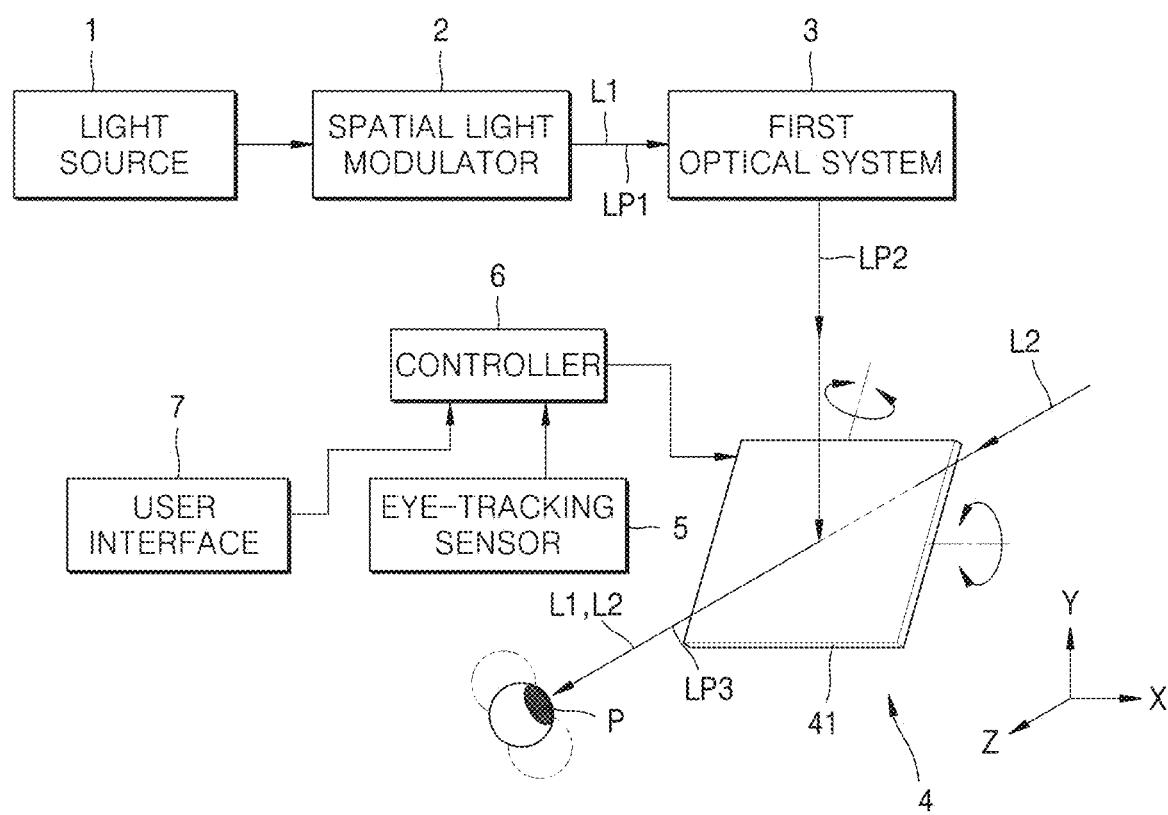
FIG. 1 illustrates a multi-image display apparatus according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments of a multi-image display apparatus will be described by referring to the accompanying drawings. In the drawings, the same reference numerals denote the same elements and sizes of elements may be exaggerated for clarity and convenience of explanation. Also, the example embodiments described hereinafter are only examples, and various modifications may be made based on the example embodiments. Also, in a layered structure described hereinafter, the expression "above" or "on" may indicate not only a case in which an element is directly above/under/on the right side/on the left side, but also a case in which the element is indirectly above/under/on the right side/on the left side.

FIG. 1 illustrates a multi-image display apparatus according to an example embodiment. Referring to FIG. 1, the multi-image display apparatus according to an example embodiment may include a light source 1, a spatial light modulator 2, a first optical system 3, and a second optical system 4.

The light source 1 may include a coherent light source emitting coherent light. To provide highly coherent light, for example, a laser diode (LD), may be used as the light source 1. When, as a steering optical device 41 to be described below, a holographic optical element is implemented, the light source 1 may include an LD. Also, the light source 1 may include a light-emitting diode (LED). An LED has a lower spatial coherence than an LD, but when light has a certain degree of spatial coherence, the light may be diffracted and modulated by the spatial light modulator 2. In addition to the LED, any other types of light sources that emit light having spatial coherence may be used as the light source 1.

The light source 1 may include a point light source emitting divergent light. A point light source, such as an LED or an LD, may directly radiate light onto the spatial light modulator 2. Also, for convenience of design, the point light source may be arranged in a different location and may radiate light onto the spatial light modulator 2 through an optical fiber. The light source 1 may include a plurality of LDs or LEDs, wherein each of the LDs or the LEDs provides red light, green light, or blue light.

The spatial light modulator 2 may form image light L1 in response to an image signal provided from an image processing apparatus. For example, the image signal may include a computer generated hologram (CGH) signal, and the spatial light modulator 2 may form a hologram pattern in response to the CGH signal. When incident light, which is emitted from the light source 1 and incident into the spatial light modulator 2, is diffracted by the hologram pattern formed by the spatial light modulator 2, a holographic image having a three-dimensional effect may be generated. The spatial light modulator 2 may include a phase modulator capable of performing only phase modulation, an amplitude modulator capable of performing only amplitude modulation, or a complex modulator capable of performing both phase modulation and amplitude modulation. For example, the spatial light modulator 2 may include a liquid crystal on silicon (LCoS) device, a digital micro-mirror device (DMD), or a semiconductor modulator.

An optical system may deliver image light L1 that is formed around the spatial light modulator 2, for example, a holographic image, to the eyes of a viewer. Also, the optical system may be configured to deliver external light L2, that is, an external panorama, to the eyes of the viewer, together with the holographic image. The characteristics of the multi-image display apparatus, such as a viewing angle of the holographic image, an image quality of an image, a size of the multi-image display apparatus, which are experienced by a viewer, may be adjusted according to a design of the optical system. The optical system may include the first optical system 3 and the second optical system 4. The first optical system 3 may deliver the image light L1 through a first light path LP1 and a second light path LP2, which is not parallel with the first light path LP1. The first optical system 3 may include various optical components configured to deliver the image light L1 to the pupil (P) of the viewer. Various optical components may include, for example, at least one of a beam splitter, a reflector, a polarization conversion device, and a lens. The second optical system 4 may deliver the external light L2, and the image light L1 which is delivered through the second light path LP2, to the pupil P of the viewer through a third light path LP3, which is not parallel with the second light path LP2. According to the example embodiment, the first light path LP1 and the second light path LP2 may be orthogonal with respect to each other, and the third light path LP3 may be orthogonal with respect to the first light path LP1 and the second light path LP2. Thus, the first light path LP1, the second light path LP2, and the third light path LP3 may be in an X direction, a Y direction, and a Z direction, respectively. The external light L2 may be incident into the pupil P through the third light path LP3 together with the image light L1.

The first optical system 3 and the second optical system 4 may form a Maxwellian view (MV) optical system in which image information is focused at one point in the pupil P and then radiated onto the retina. When the pupil P is located at a focal point of the first optical system 3 and the second optical system 4, an image may be clearly viewed. As a size of the point, at which the image information is contained, is increased, an area in which the viewer may clearly view the image, that is, an eye box, may be increased. A reference size of a point of the MV optical system may be about 1 mm, and when the size of the point is greater than about 1 mm, the corresponding optical system may not be regarded as the MV optical system. Not only the MV optical system, but also optical systems in which the eye box has a sufficiently small size, may be applied to the multi-image display apparatus according to the example embodiment.

When the location of the pupil P is moved, the image information may not enter into the pupil P, and thus, it may be impossible to view the image or the image may not be clearly viewed. For example, when the pupil P is moved in an X-Y plane, the image light L1 and the external light L2 that are delivered through the third light path LP3 may not be incident into the pupil P. Thus, the multi-image display apparatus according to an example embodiment may include a structure configured to change a progression direction of the light delivered through the third light path LP3 via the second optical system 4 according to the location of the pupil P. For example, the second optical system 4 implemented in the multi-image display apparatus according to an example embodiment may include the steering optical device 41 located at a crossing point of the second light path LP2 and the third light path LP3 and configured to perform a two-axis rotation. The steering optical device 41 may be an optical device that is most adjacent to the pupil P from among optical devices included in the second optical system 4. That is, the steering optical device 41 may be an optical device located at a tip end of the second optical system 4 closest to the pupil P. Thus, a compact multi-image display apparatus, in which a light progression direction may be changed according to a location of the pupil P without moving the optical devices located before the steering optical device 41 may be implemented.

According to an example embodiment, the steering optical device 41 may include a half-transmittance mirror configured to reflect half of the incident light and transmit the other half of the incident light. For example, the steering optical device 41 may reflect the light that is incident from the second light path LP2 toward the third light path LP3. Also, the steering optical device 41 may transmit the external light L2 and guide the external light L2 through the third light path LP3. Thus, the image light L1 and the external light L2 may be incident into the pupil P through the third light path LP3.

Figure 2A:
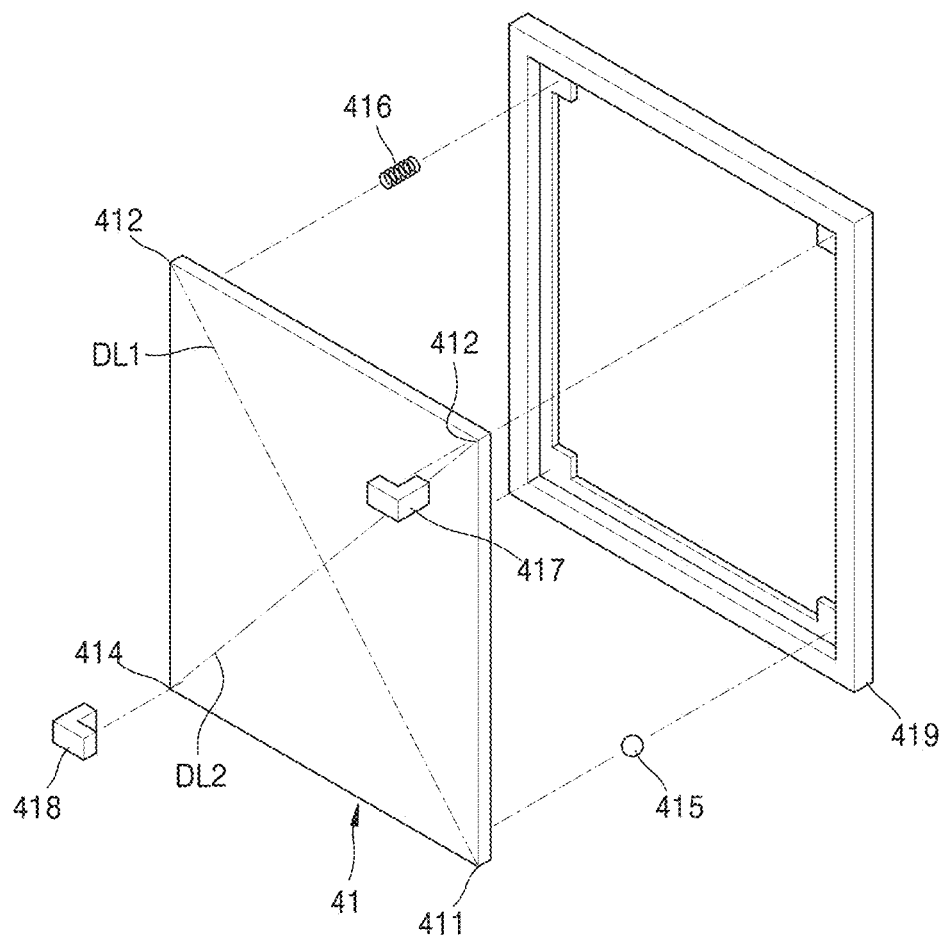
FIG. 2A is an exploded perspective view of an example of a structure for two-axis driving a steering optical device according to an example embodiment.
Figure 2B:
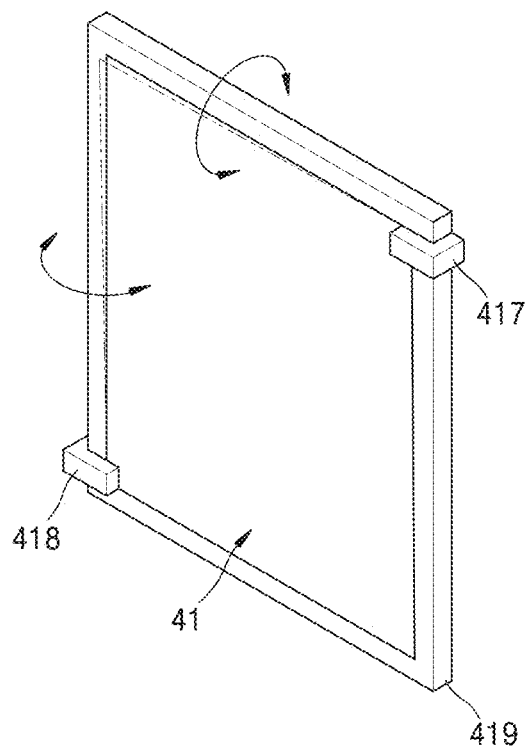
FIG. 2B is a perspective view of the example of the structure for two-axis driving the steering optical device, the example being illustrated in FIG. 2A.

The steering optical device 41 may be two-axis driven via various driving structures such as a motor. The location of the pupil P may be moved in the X-Y plane, and the steering optical device 41 may be driven to change a progression direction of light, for example, in the X direction and the Y direction. FIG. 2A is an exploded perspective view of an example of a structure for two-axis driving the steering optical device 41 according to an example embodiment, and FIG. 2B is a perspective view of the example of the structure for two-axis driving the steering optical device 41 illustrated in FIG. 2A. Referring to FIGS. 2A and 2B, the steering optical device 41 may be supported by a frame 419 such that the steering optical device 41 may be two-axis driven. For example, a first edge 411 of the steering optical device 41 may be supported to be pivoted by a supporter 415. The supporter 415 may be, for example, as a globular structure, a ball joint structure, etc., between the frame 419 and the first edge 411 of the steering optical device 41. An elastic supporter 416 may elastically support a second edge 412 of the steering optical device 41. The second edge 412 may face the first edge 411 in a direction of a first diagonal line DL1. For example, the elastic supporter 416 may be realized as a compression spring between the second edge 412 of the steering optical device 41 and the frame 419. The elastic supporter 416 may elastically support the second edge 412, for example, in the Z direction. A first actuator 417 and a second actuator 418 may displace a third edge 413 and a fourth edge 414 of the steering optical device 41, respectively. The third and fourth edges 413 and 414 may be edges in a direction of a second diagonal line DL2 that crosses the first diagonal line DL1. The first and second actuators 417 and 418 may be various driving structures such as, for example, a voice coil motor, a shape memory alloy, and a heater heating the shape memory alloy. For example, the first and second actuators 417 and 418 may displace the third and fourth edges 413 and 414 in the Z direction. However, the first and second actuators 417 and 418 may displace the third and fourth edges 413 and 414 in a direction that is orthogonal with respect to a plane including the steering optical device 41. By making the displacements of the third and fourth edges 413 and 414 the same as or different from each other, the steering optical device 41 may be two-axis pivoted with respect to an X axis and a Y axis, according to the location of the pupil P. Thus, a progression direction of the light progressing through the third light path LP3 may be changed and may be incident into the pupil P.

Figure 3:
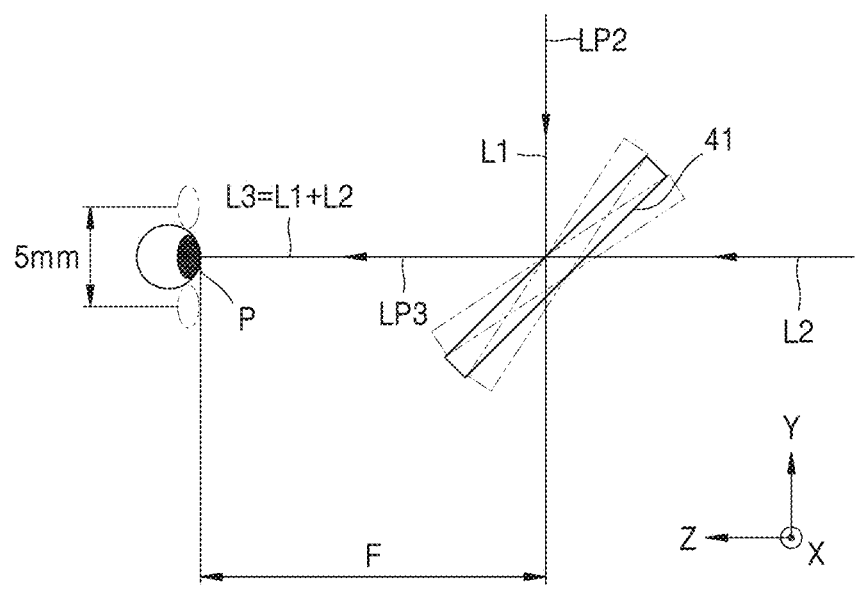
FIG. 3 illustrates an example of an operating range of a steering optical device according to an example embodiment.

FIG. 3 illustrates an example of an operating range of the steering optical device 41 in FIG. 1. In FIG. 3, a distance F between the steering optical device 41 and the pupil P may be, for example, about 32 mm. For example, when a movement range of the pupil P, that is, an eye box, which corresponds to about 5 mm×5 mm, is needed, a central angle of the eye box may be arcsin (±2.5/32)=±4.48°, and the steering optical device 41 may be pivoted by ±2.24°. Here, when the steering optical device 41 has a size of 30 mm×50 mm, the maximum displacement of an edge of the steering optical device 41 may be about ±1.2 mm×±2.0 mm. When an eye box having a size of about 7 mm×7 mm is needed, and when the steering optical device 41 has the size of 30 mm×50 mm, the maximum displacement of the edge of the steering optical device 41 may be ±1.6 mm×±2.7 mm.

As shown above, when the optical device at the tip end of the optical system, that is, the steering optical device 41, is two-axis driven, an eye box having a sufficient size may be provided via a very small displacement of the steering optical device 41. Accordingly, clear image information may be provided to the pupil P. In addition, because the steering optical device 41 has the very small displacement, a compact operation structure, such as a voice coil motor, a shape memory alloy and a heater heating the shape memory alloy, may be implemented as the first and second actuators 417 and 418. Thus, a compact multi-image display apparatus in which a viewing area is increased may be realized.

Referring to FIG. 1, the multi-image display apparatus according to an example embodiment may include an eye-tracking sensor 5. The eye-tracking sensor 5 may track a movement of the pupil P and transmit location information of the pupil P to a controller 6, and the controller 6 may drive the first and second actuators 417 and 418 according to the location information of the pupil P so as to pivot the steering optical device 41 such that light is delivered to the pupil P. The multi-image display apparatus may further include a user interface 7. In response to a user input signal received from the user interface 7, the first and second actuators 417 and 418 may be driven so as to pivot the steering optical device 41 such that the light is delivered to the pupil P.

As described above, the optical system includes the first through third light paths LP1, LP2, and LP3. The first light path LP1 may not be parallel with the second light path LP2, and the third light path LP3 may not be parallel with the second light path LP2. The first and third light paths LP1 and LP3 may be orthogonal with respect to the second light path LP2. The first through third light paths LP1, LP2, and LP3 may be orthogonal with respect to one another. In this case, the first through third light paths LP1, LP2, and LP3 may extend in an X direction, a Y direction, and a Z direction, respectively. Through this arrangement of the first through third light paths LP1, LP2, and LP3, a form factor of the multi-image display apparatus may be reduced, and the image light L1 and the external light L2 may be provided to the pupil P of a viewer through the third light path LP3. For example, a holographic image reproduced by the spatial light modulator 2 and an external image containing an actual external panorama may be simultaneously provided to the pupil P of the viewer. Then, the user may view the holographic image containing virtual reality or virtual information, together with a background subject of a real world that the user actually faces. Accordingly, the multi-image display apparatus according to the example embodiment may be adopted to realize augmented reality (AR) or mixed reality (MR). In this case, the multi-image display apparatus according to the example embodiment may correspond to a near-eye AR display apparatus. Also, by two-axis driving the steering optical device 41 located at a tip end of the optical system, a compact multi-image display apparatus capable of having the image light L1 and the external light L2 incident into the pupil P according to a movement of the pupil P may be realized.

Figure 4:
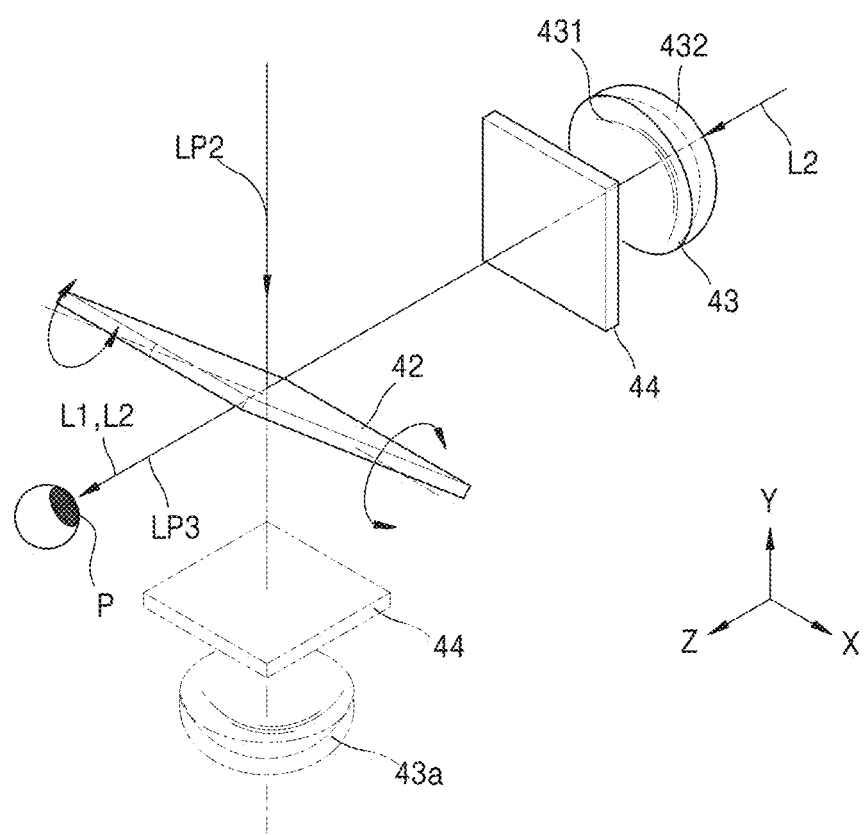
FIG. 4 illustrates an example of a multi-image display apparatus according to an example embodiment.

FIG. 4 illustrates a multi-image display apparatus according to an example embodiment. In the multi-image display apparatus according to the example embodiment, the steering optical device may be a polarization beam splitter 42 configured to reflect light having a first linear polarization component and transmit light having a second linear polarization component, which is orthogonal with respect to the first linear polarization component. In this respect, the multi-image display apparatus according to the example embodiment is different from the multi-image display apparatus illustrated in FIG. 1. Hereinafter, different aspects will be mainly described.

Referring to FIG. 4, the second optical system 4 may include the polarization beam splitter 42 corresponding to the steering optical device, a half-transmittance reflector 43 having a first surface 431 reflecting light reflected from the polarization light beam splitter 42 again to the polarization beam splitter 42, and a second surface 432, which is an opposite surface of the first surface 431 and which transmits the external light L2 toward the polarization light beam splitter 42, and a ¼ wavelength plate 44 located between the polarization beam splitter 42 and the half-transmittance reflector 43. The ¼ wavelength plate 44 may convert linear polarization light into circular polarization light and circular polarization light into linear polarization light. The polarization beam splitter 42 may be two-axis driven. For example, the polarization beam splitter 42 may be two-axis driven by the driving structures illustrated in FIGS. 2A and 2B.

Referring to FIG. 4, light of the first linear polarization component progressing from the first optical system 3 through the second light path LP2 may be incident into the polarization beam splitter 42. The light of the first linear polarization component reflected from the polarization beam splitter 42 may be incident into the half-transmittance reflector 43. The light of the first linear polarization component may be converted into light of a first circular polarization component by passing through the ¼ wavelength plate 44 located between the polarization beam splitter 42 and the half-transmittance reflector 43. The light having the first circular polarization component may be reflected toward the polarization beam splitter 42 by the first surface 431 of the half-transmittance reflector 43. Here, the polarization component of the light reflected by the half-transmittance reflector 43 may be converted into a second circular polarization component. When the reflected light passes through the ¼ wavelength plate 44 again, the reflected light may have a second linear polarization component. The light having the second linear polarization component may be incident into the pupil P of a viewer by passing through the polarization beam splitter 42. According to the example embodiment, the half-transmittance reflector 43 may include a concave reflector configured to converge reflective light. For example, the first surface 431 of the half-transmittance reflector 43 may be concave. Thus, image light L1, that is, a holographic image, may be focused and provided to the pupil P of the viewer through the half-transmittance reflector 43. The second surface 432 of the half-transmittance reflector 43 may transmit light containing an external panorama, that is, external light L2. Thus, the external light L2 may pass through the half-transmittance reflector 43 and the polarization beam splitter 42 and may be incident into the pupil P of the viewer.

As another example, the half-transmittance reflector 43 may include a polarization selective mirror configured to reflect light having the first circular polarization component and transmit light having the second circular polarization component. In this case, because the light reflected from the polarization beam splitter 42 and having passed through the ¼ wavelength plate 44 has the first circular polarization component, the light may be reflected by the first surface 431 of the half-transmittance reflector 43. The reflected light may have the second circular polarization component and may have the second linear polarization component by passing through the ¼ wavelength plate 44 again. Light having the second circular polarization component of the external light L2 may pass through the second surface 432 of the half-transmittance reflector 43, and then, may pass through the ¼ wavelength plate 44 to have the second linear polarization component. The image light L1 and the external light L2 having the second linear polarization component may pass through the polarization beam splitter 42 and may be incident into the pupil P of the viewer.

According to the example embodiment as illustrated in FIG. 4, it is described that the polarization beam splitter 42 may reflect the light of the first linear polarization component and may transmit the light of the second linear polarization component. However, embodiments are not necessarily limited thereto. The polarization beam splitter 42 may transmit the light of the first linear polarization component and may reflect the light of the second linear polarization component. In this case, the ¼ wavelength plate 44 and a reflector 43a may be located below the polarization beam splitter 42 in a Y direction. The reflector 43a may be the same as the half-transmittance reflector 43a except that the reflector 43a may not be a half-transmittance type. Based on this structure, the light of the first linear polarization component, which is incident into the polarization beam splitter 42 from the first optical system 3, may pass through the polarization beam splitter 42 and the ¼ wavelength plate 44 and may be incident into the reflector 43a. Here, the light may have the first circular polarization component. The light having the first circular polarization component may be reflected toward an opposite direction by the reflector 43a and may be converted into light of the second circular polarization component. Also, the light may pass through the ¼ wavelength plate 44 again and may have the second linear polarization component. The light having the second linear polarization component may be reflected by the polarization beam splitter 42 and may be incident into the pupil P of the viewer. Light having the first linear polarization component of the external light L2 may be incident into the pupil P of the viewer by passing through the polarization beam splitter 42. Thus, the holographic image may have the second linear polarization component and the external image may have the first linear polarization component.

Figure 5:
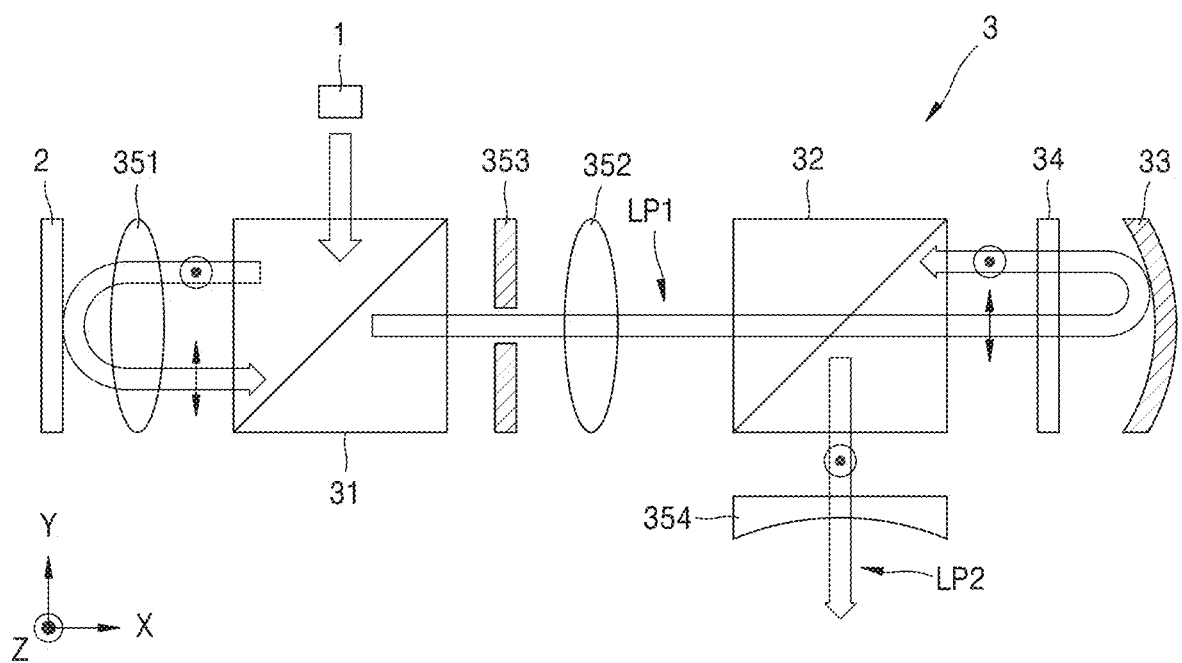
FIG. 5 is a schematic X-Y plan view an example of a first optical system illustrated in FIG. 1 according to an example embodiment.

FIG. 5 is a schematic X-Y plan view of an example of the first optical system 3 illustrated in FIG. 1 according to an example embodiment. In this example, a reflective spatial light modulator configured to reflect and modulate light emitted from the light source 1 may be implemented as the spatial light modulator 2. Referring to FIG. 5, optical components of the first optical system 3 may be arranged along the first light path LP1. That is, the optical components of the first optical system 3 may be arranged in an X direction. The first optical system 3 may include a first beam splitter 31, a second beam splitter 32, a reflector 33, and a ¼ wavelength plate 34. In order to use light efficiently, a polarization beam splitter configured to transmit or reflect incident light according to a polarization state of the incident light may be implemented as the first and second beam splitters 31 and 32. In FIG. 5, the first linear polarization component may be indicated as '⊙' and the second linear polarization component may be indicated as '↕'.

The first beam splitter 31 may reflect the first linear polarization component of light radiated from the light source 1 toward the spatial light modulator 2 and may transmit light of the second linear polarization component modulated and reflected from the spatial light modulator 2.

The second beam splitter 32 may be located at an emission side of the first beam splitter 31 and may reflect light of the first linear polarization component toward the second light path LP2 and may transmit the light of the second linear polarization component. The reflector 33 may reflect the light transmitted through the second beam splitter 32 toward the second beam splitter 32. The ¼ wavelength plate 34 may be located between the second beam splitter 32 and the reflector 33. The ¼ wavelength plate 34 may convert linear polarization light into circular polarization light and the circular polarization light into the linear polarization light.

Light having the first linear polarization component of the light emitted from the light source 1 may be reflected by the first beam splitter 31 and light having the second linear polarization component may be transmitted through the first beam splitter 32. The light having the first linear polarization component reflected by the first beam splitter 31 may be incident into the spatial light modulator 2. The first optical system 3 may further include a first lens 351 arranged between the first beam splitter 31 and the spatial light modulator 2. The light emitted from the light source 1 may include a divergent beam having a beam diameter which is increased toward a light progression direction. The first lens 351 may make the light from the first beam splitter 31 as parallel light having a constant beam diameter. To this end, the first lens 351 may include a convex lens. Thus, the parallel light having the constant beam diameter may be incident into the spatial light modulator 2.

The spatial light modulator 2 may modulate and reflect the incident light. A holographic image may be formed by the modulated light interfering with each other. Also, when the light is reflected and modulated by the spatial light modulator 2, the light may have the second linear polarization component. The light may be focused by passing through the first lens 351. Thus, the light may have a beam diameter which is decreased along a light progression direction. Based on this method, the light containing the holographic image may be incident again into the first beam splitter 31 and may pass through the first beam splitter 31 to be incident into the second beam splitter 32.

The first optical system 3 may further include a spatial filter 353 and a second lens 352 arranged at the first light path LP1 between the first beam splitter 31 and the second beam splitter 32. The spatial filter 353 may remove unnecessary optical components, except the holographic image. The spatial filter 353 and the second lens 352 may be arranged around a focal point of the first lens 351. FIG. 5 illustrates that the spatial filter 353 is arranged at an upstream and the second lens 352 is arranged at a downstream according to a light progression direction. However, embodiments are not necessarily limited thereto. For example, the second lens 352 may be arranged at an upstream and the spatial filter 353 may be arranged at a downstream according to a light progression direction. The light focused by the first lens 351 may again become a divergent beam having a beam diameter which is gradually increased, by passing through the focal point of the first lens 351. Here, the second lens 352 may suppress the beam diameter of the light incident into the second beam splitter 32 from being excessively increased. For example, the second lens 352 may make the light incident into the second beam splitter 32 as parallel light or a divergent beam having a beam diameter which is gradually increased. To this end, the second lens 352 may include a convex lens.

The light having the second linear polarization component that is emitted from the first beam splitter 31 may be transmitted through the second beam splitter 32 and may pass through the ¼ wavelength plate 34 to be incident into the reflector 33. The light having the second linear polarization component that is emitted from the second beam splitter 32 may have the second circular polarization component by passing through the ¼ wavelength plate 34. The light having the second circular polarization component may be reflected toward an opposite direction, that is, a direction of 180 degrees with respect to an incident direction, by the reflector 33. Here, the polarization component of the light reflected by the reflector 33 may be converted into the first circular polarization component. Then, the light may have the first linear polarization component by passing through the ¼ wavelength plate 34 again. Thereafter, the light having the first linear polarization component may be reflected toward the second light path LP2 by the second beam splitter 32.

The first optical system 3 may further include a third lens 354 arranged at an emission side of the second beam splitter 32. According to the example embodiment, the reflector 33 may include a concave reflector having a concave reflective surface. Thus, the reflector 33 may make the reflected light as a convergent beam having a beam diameter which is decreased toward a light progression direction. The third lens 354 may make the convergent beam as the divergent beam again in order to increase a viewing angle of the holographic image viewed by the viewer. To this end, the third lens 354 may include a concave lens. The light passing through the third lens 354 may be incident into the polarization beam splitter 42 (FIG. 4).

The multi-image display apparatus according to the example embodiment described above in detail may provide a holographic image having a three-dimensional effect along with an actual external panorama. Thus, a relatively more realistic AR experience may be provided. Also, the multi-image display apparatus according to the example embodiment described above in detail may form the first through third light paths LP1, LP2, and LP3 by using the first and second beam splitters 31 and 32 and the polarization beam splitter 42, and thus, a length of the light path may be increased in a small space to have a small form factor, based on which the miniaturization of the multi-image display apparatus may be realized. Accordingly, the multi-image display apparatus may have a reduced volume and a reduced weight, to increase user convenience. Also, the multi-image display apparatus according to the example embodiment described above in detail may realize a relatively wide viewing angle of about 60 degrees. Also, by two-axis driving, as the steering optical device, the polarization beam splitter 42 located at a tip end of the optical system, a compact multi-image display apparatus capable of having the image light L1 and the external light L2 incident into the pupil P according to a movement of the pupil P may be realized.

Figure 6:
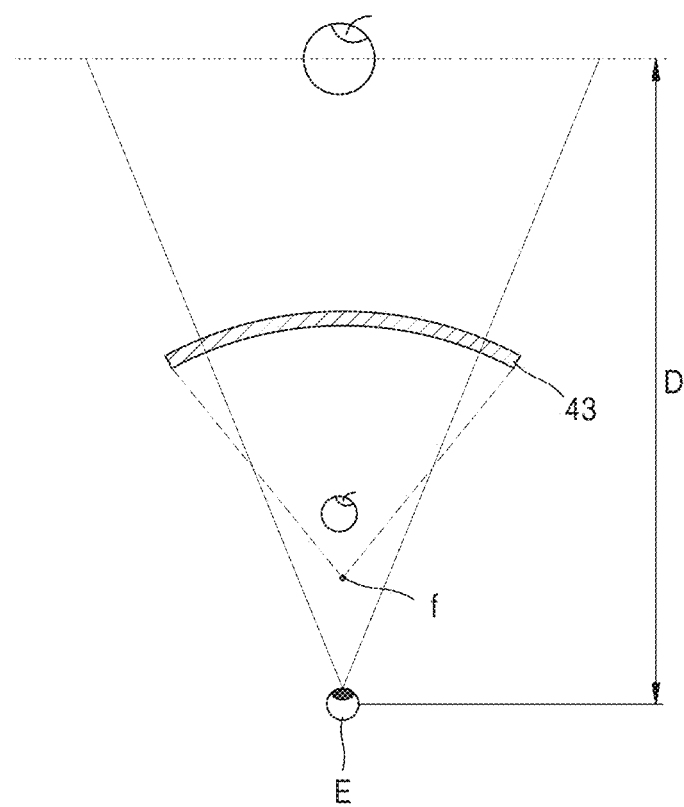
FIGS. 6 and 7 illustrates a principle of adjusting a depth of a holographic image viewed by a viewer via the multi-image display apparatus illustrated in FIGS. 4 and 5.
Figure 7:
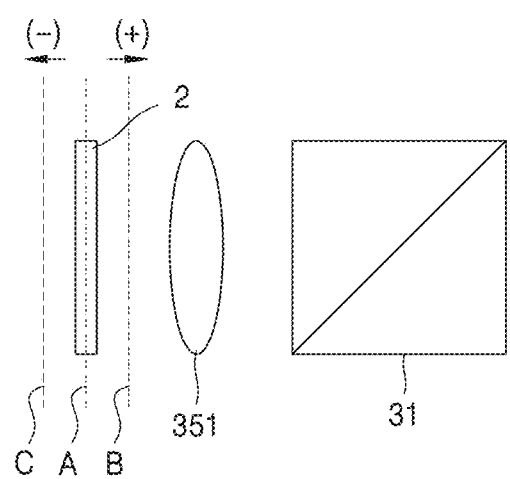

For example, FIGS. 6 and 7 illustrate a principle of adjusting a depth of a holographic image viewed by a viewer, via the multi-image display apparatus illustrated in FIGS. 4 and 5. In FIG. 6, f indicates a focal point of the half-transmittance reflector 43. When parallel light is incident into the half-transmittance reflector 43, light reflected from the half-transmittance reflector 43 may be focused at the focal point f. However, because the light diverged by the third lens 354, which is a concave lens, is incident into the half-transmittance reflector 43, light may be focused at the eye E of the viewer, which is farther from the half-transmittance reflector 43 than the focal point f. A real image may be formed between the half-transmittance reflector 43 and the focal point f by adjusting power of the optical components, such as the first lens 351, the second lens 352, the reflector 33, and the third lens 354. Then, an enlarged virtual image may be viewed by the eye E of the viewer, the enlarged virtual image being formed at a location spaced apart from the viewer by a distance D. Thus, the multi-image display apparatus may realize a relatively wide viewing angle.

The depth of the holographic image that is reproduced, that is, the distance D, may be adjusted by a location of the real image formed around the spatial light modulator 2. Referring to FIG. 7, a hologram data signal provided to the spatial light modulator 2 from an image processing apparatus may include depth information of the holographic image to be reproduced. According to the depth information, a location of a holographic plane of the image formed around the spatial light modulator 2 may be changed. Then, a location of the real image projected on a light path between the half-transmittance reflector 43 and its focal point f from the holographic plane by the first optical system 3 and the second optical system 4 may be changed. Thus, the distance at which the enlarged virtual image is viewed by the viewer may be changed.

For example, when the location of the holographic plane corresponds to a location of the spatial light modulator 2, as indicated as A, the location of the holographic plane may be 0 (zero). Also, when the holographic plane is located in a direction in which light progresses from a reflective surface of the spatial light modulator 2, as indicated as B, a location value of the holographic plane may be positive (+). Also, when the holographic plane is in a direction opposite to the direction in which the light progresses from the reflective surface of the spatial light modulator 2, as indicated as C, the location value of the holographic plane may be negative (−). When the location value of the holographic plane is increased in a positive (+) direction, for example, when the holographic plane becomes farther from the spatial light modulator 2 in the direction in which the light progresses from the reflective surface of the spatial light modulator 2, the virtual image of the reproduced holographic image may be viewed by the viewer as being closer. That is, the distance D may be decreased. When the location value of the holographic plane is increased in a negative (−) direction, for example, when the holographic plane becomes farther from the spatial light modulator 2 in the direction opposite to the direction in which the light progresses from the reflective surface of the spatial light modulator 2, the virtual image of the reproduced holographic image may be viewed by the viewer as being farther. That is, the distance D may be increased.

A left eye device and a right eye device each including the light source 1, the spatial light modulator 2, the first optical system 3, and the second optical system 4 described above may be formed. Also, holographic images respectively having a left eye point of view and a right eye point of view of a viewer may be reproduced by the left eye device and the right eye device, respectively. Based on this configuration, a virtual holographic image together with an image containing an actual external panorama may be provided to both eyes of the viewer.

In the example embodiments described above, all of the reflector 33 (FIG. 5), the half-transmittance reflector 43 (FIG. 4), and the reflector 43a (FIG. 4) may correspond to concave reflectors having positive (+) power. However, one or all of the reflector 33, the half-transmittance reflector 43, and the reflector 43a may correspond to plane reflectors. For example, when the reflector 33 (FIG. 5) is a plane mirror, a curvature of the first through third lenses 351, 352, and 354, and the half-transmittance reflector 43 (FIG. 4) or the reflector 43a (FIG. 4) may be determined such that a holographic image may be accurately provided to the pupil P of the viewer. Also, when all of the reflector 33 (FIG. 5), the half-transmittance reflector 43 (FIG. 4), and the reflector 43a (FIG. 4) are plane reflectors, the curvature of the first through third lenses 351, 353, and 354 may be determined such that a holographic image may be accurately provided to the eye E of the viewer.

Figure 8:
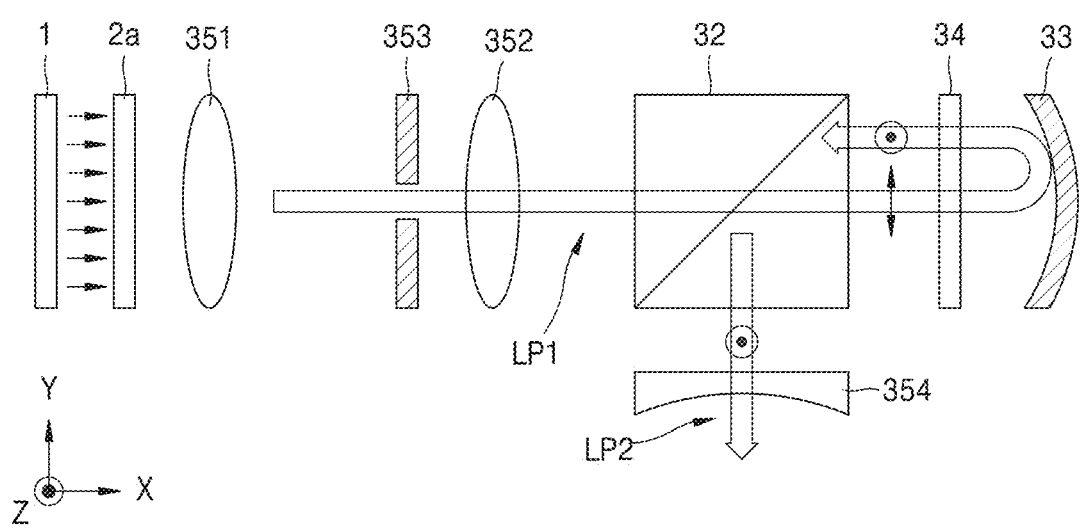
FIG. 8 is a schematic X-Y plan view of an example of a first optical system illustrated in FIG. 1 according to another example embodiment.

FIG. 8 illustrates schematic X-Y plan view of an example of the first optical system 3 illustrated in FIG. 1 according to another example embodiment. The example embodiment differs from the example embodiment illustrated in FIG. 5 in that the first optical system 3 includes a transmissive spatial light modulator 2a configured to transmit and modulate light emitted from the light source 1. Hereinafter, different aspects will be mainly described. Referring to FIG. 8, optical components of the first optical system 3 may be arranged along the first light path LP1. That is, the optical components of the first optical system 3 may be arranged in an X direction. The first optical system 3 may include the first lens 351, the spatial filter 353, the second lens 352, the second beam splitter 32, the reflector 33, and the ¼ wavelength plate 34. The light source 1 may include a surface light source. However, the light source 1 may include a point light source and a collimating lens. As the transmissive spatial light modulator 2a, for example, a semiconductor modulator based on a compound semiconductor, such as gallium arsenide (GaAs), or a liquid crystal device (LCD) may be used. When the transmissive spatial light modulator 2a is implemented, the first beam splitter 31 may be omitted, and thus, the structure of the optical system may become more simplified.

Figure 9:
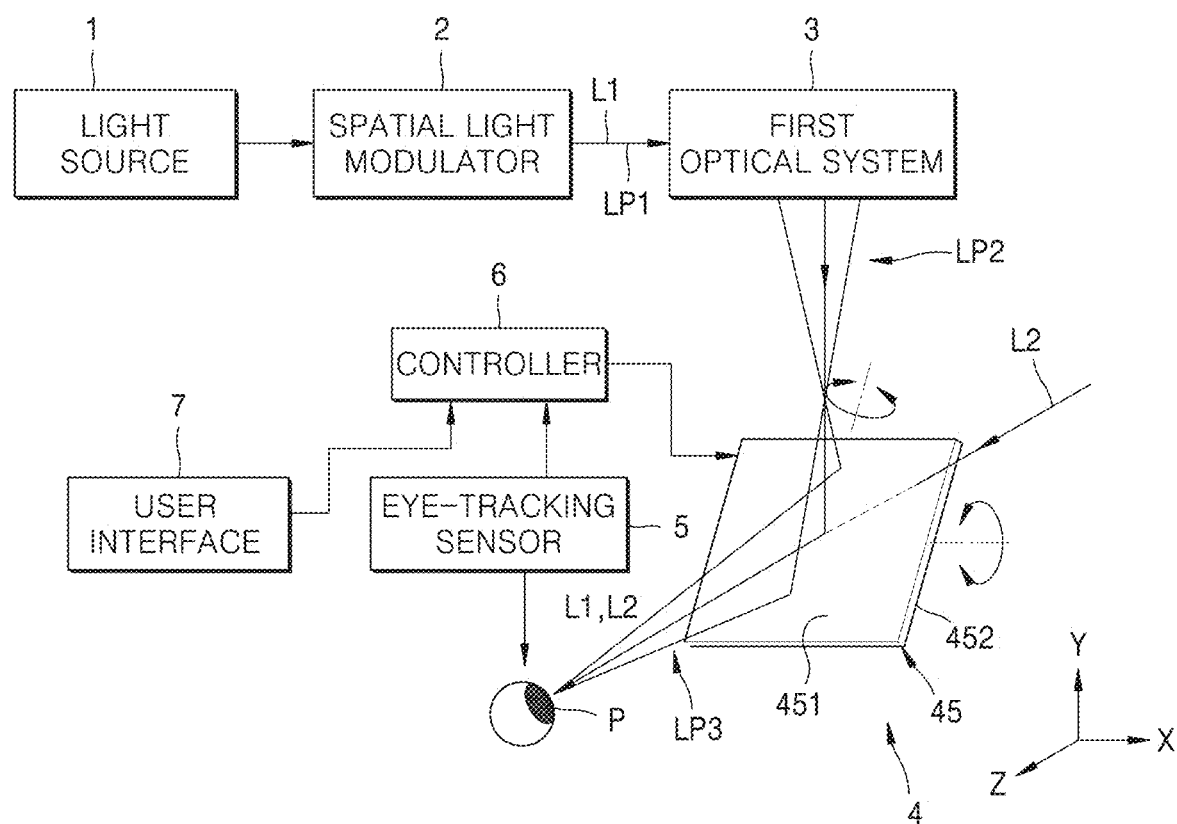
FIG. 9 illustrates an example of a multi-image display apparatus according to an example embodiment.

FIG. 9 illustrates a multi-image display apparatus according to another example embodiment. The multi-image display apparatus according to the example embodiment may differ from the multi-image display apparatus illustrated in FIG. 1, in that the multi-image display apparatus according to the example embodiment implements a holographic optical element (HOE) 45 as a steering optical device. Hereinafter, different aspects will be mainly described.

Referring to FIG. 9, light radiated from the light source 1 may be modulated by the spatial light modulator 2. Image light L1 emitted from the spatial light modulator 2 and progressing through the first light path LP1 may be guided to the second light path LP2 by the first optical system 3. The second optical system 4 may deliver external light L2, and the image light L1 delivered through the second light path LP2 to the pupil P of a viewer through the third light path LP3. The third light path LP3 may be orthogonal with respect to the second light path LP2, and may be orthogonal with respect to the first and second light paths LP1 and LP2.

The light source 1 may include, for example, a coherent light source emitting coherent light. To provide highly coherent light, for example, an LD may be used as the light source 1. A wavelength of the light source 1 may be the same as a wavelength of a hologram pattern provided in the HOE 45.

The second optical system 4 may include the HOE 45. The HOE 45 may be two-axis driven. For example, the HOE 45 may be two-axis driven by the driving structures illustrated in FIGS. 2A and 2B. The HOE 45 may include a first surface 451 and a second surface 452. The image light L1 emitted from the first optical system 3 through the second light path LP2 may be incident onto the first surface 451. The first surface 451 may face the pupil P of the viewer. A hologram optical pattern focusing the image light L1 to the pupil P may be formed on the first surface 451. The second surface 452 may be the opposite surface of the first surface 451, and the external light L2 may be incident onto the second surface 452. The second surface 452 may transmit the external light L2. Based on this structure, the image light L1 provided from the first optical system 3 and the external light L2 may be provided to the pupil P of the viewer. Also, by two-axis driving the HOE 45, a progression direction of light progressing through the third light path LP3 may be changed according to a movement of the pupil P or a user input.

Figure 10:
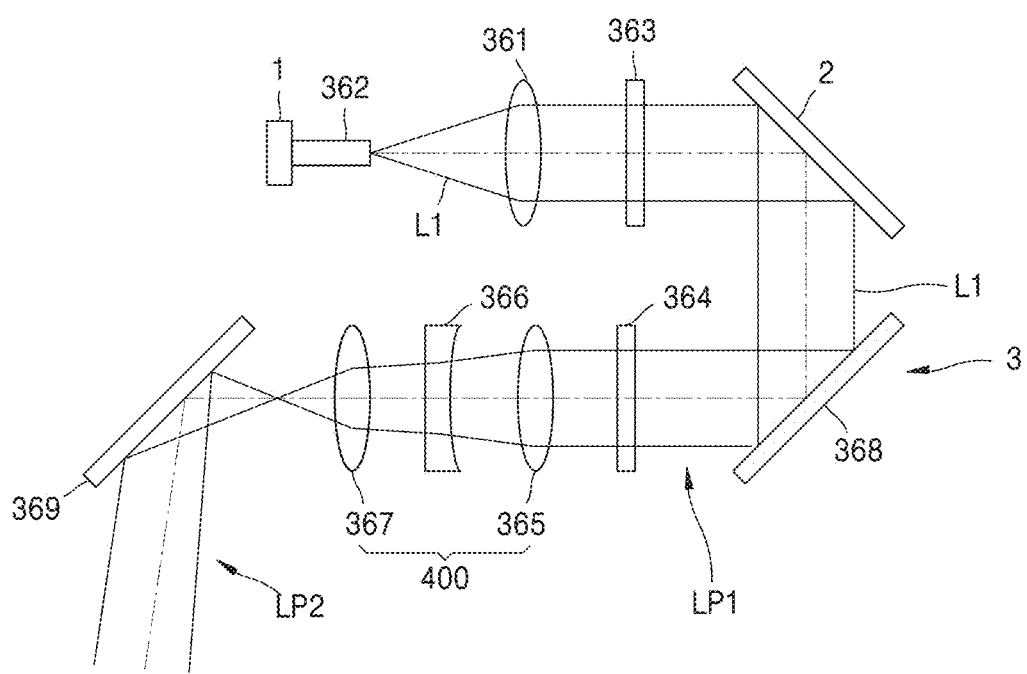
FIG. 10 illustrates a first optical system applied to the multi-image display apparatus illustrated in FIG. 9 according to an example embodiment.

FIG. 10 illustrates the first optical system 3 applied to the multi-image display apparatus illustrated in FIG. 9 according to an example embodiment. Referring to FIG. 10, the light radiated from the light source 1 may be converted into parallel light by a collimating lens 361. The light radiated from the light source 1 may be delivered to the collimating lens 361, for example, through a light delivering member 362, such as a light fiber, etc. The parallel light may be incident into the spatial light modulator 2. The first optical system 3 may include a reflector 368 configured to deliver the image light L1 modulated by the spatial light modulator 2 through the first light path LP1, a plurality of lenses 365, 366, and 367 configured to provide light diverged in a predetermined angle to the HOE 45 (FIG. 9), and a reflector 369 configured to deliver the light progressing through the first light path LP1 through the second light path LP2. Polarization plates 363 and 364 may be arranged at an incident side of the spatial light modulator 2 and an emission side of the reflector 368, respectively. The polarization plates 363 and 364 may have the same polarization directions. For example, light having passed through the polarization plates 363 and 364 may be polarized in the same direction. The first optical system 3 may include the plurality of lenses 365, 366, and 367. The plurality of lenses 365, 366, and 367 may have appropriate curvatures to provide light diverged in a predetermined angle to the HOE 45 (FIG. 9). For example, in the example embodiment, the lenses 365 and 367 may include convex lenses, and the lens 366 located between the lenses 365 and 367 may include a concave lens. The plurality of lenses 365, 366, and 367 may form a correction optical system 400 for correcting aberration of the first optical system 3. Light having passed through the plurality of lenses 365, 366, and 367 may be guided to the second light path LP2 by the reflector 369.

Figure 11:
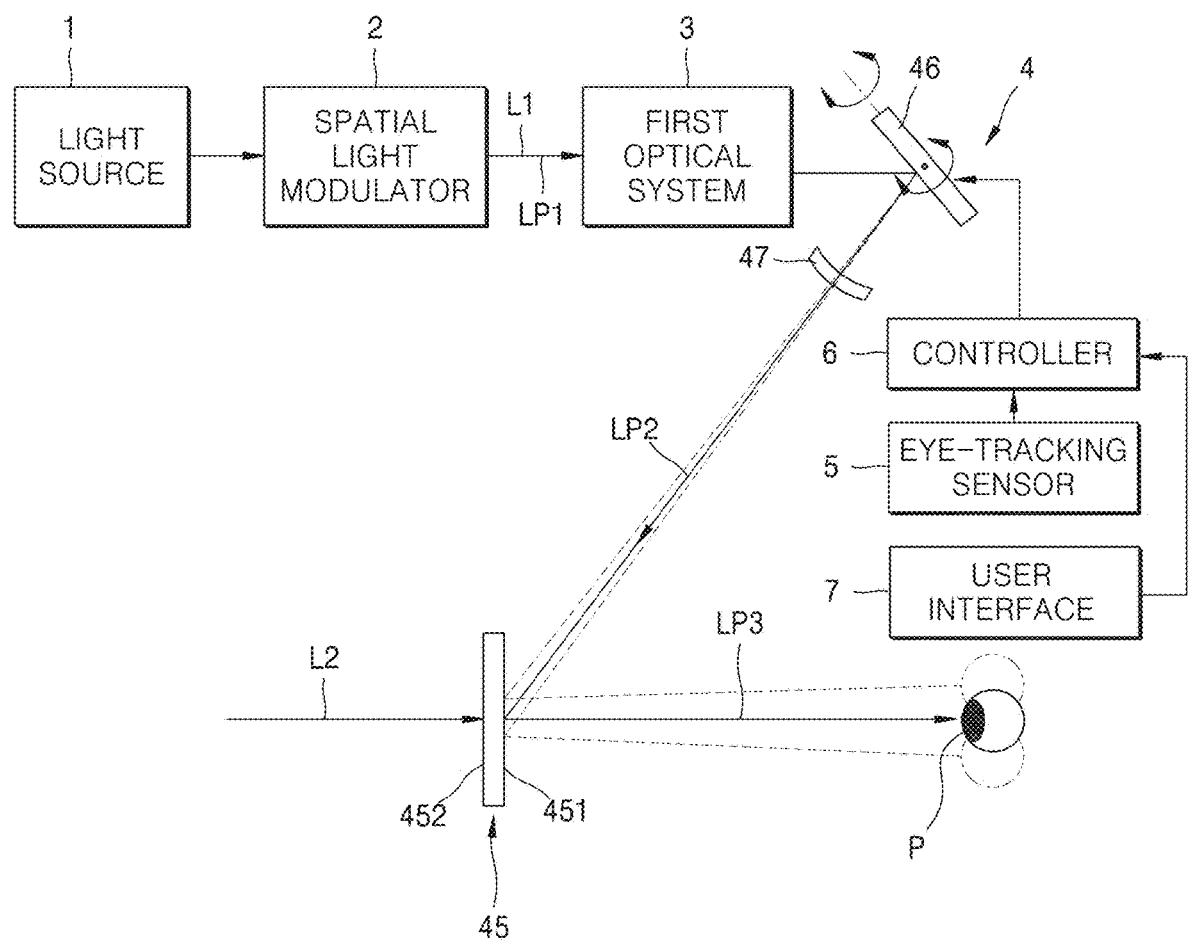
FIG. 11 illustrates an example of a multi-image display apparatus according to an example embodiment.

FIG. 11 illustrates a multi-image display apparatus according to an example embodiment. The multi-image display apparatus in the example embodiment may differ from the multi-image display apparatus illustrated in FIG. 9 in that the HOE 45 may be located at a fixed location, and a reflector 5 capable of a two-axis rotation may be implemented. Hereinafter, different aspects will be mainly described.

Referring to FIG. 11, the light source 1 may include, for example, a coherent light source emitting coherent light. To provide highly coherent light, for example, an LD may be used as the light source 1. A wavelength of the light source 1 may be the same as a wavelength of a hologram pattern provided in the HOE 45. The spatial light modulator 2 may modulate the light radiated from the light source 1 to generate the image light L1. The first optical system 3 may deliver the image light L1 through the first light path LP1. The second optical system 4 may include a steering optical device capable of a two-axis rotation for steering the image light L1 delivered through the first light path LP1. For example, the second optical system 4 may include the reflector 46. The second optical system 4 may deliver the steered image light L1 through the second light path LP2 that is not parallel with the first light path LP1. As a structure for two-axis rotating the reflector 46, the structures illustrated in FIGS. 2A and 2B may be implemented. The HOE 45 may deliver the steered image light L1 and the external light L2 to the pupil P of a viewer through the third light path LP3. The HOE 45 may have a first surface 451 on which a hologram optical pattern for focusing the image light L1 is formed and a second surface 452 onto which the external light L2 is incident. The pupil P may be located between the HOE 45 and a focusing point formed by the HOE 45. That is, the HOE 45 may form the focusing point behind the pupil P. A distance between the pupil P and the focusing point may be, for example, about 2 mm to about 5 mm. Based on this structure, the reflector 5 may be two-axis driven, and thus, a viewing area may be increased. This aspect will be described below with reference to FIG. 13.

Figure 12:
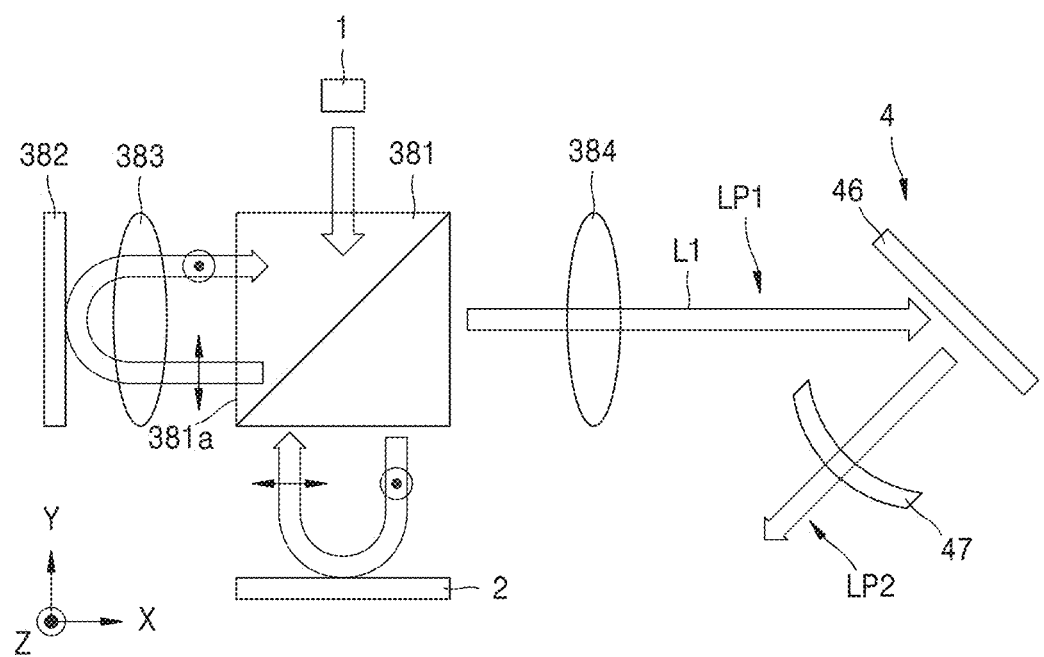
FIG. 12 illustrates an example of a first optical system and a second optical system illustrated in FIG. 11 according to an example embodiment.

FIG. 12 illustrates the first optical system 3 and the second optical system 4 according to an example embodiment. Referring to FIG. 12, the spatial light modulator 2 may be a reflective spatial light modulator configured to reflect and modulate light radiated from the light source 1. Optical components of the first optical system 3 may be arranged along the first light path LP1. A beam splitter 381, a concave reflector 382, a ¼ wavelength plate 383, and a first lens 384 may be included. In order to use light efficiently, a polarization beam splitter configured to transmit or reflect incident light according to a polarization state of the incident light may be implemented as the beam splitter 381. In FIG. 12, a first linear polarization component may be indicated as '⊙' and a second linear polarization component may be indicated as '↕'. The second optical system 4 may include a reflector 46, which is a steering optical device, and a second lens 47.

The beam splitter 381 may transmit the first linear polarization component of the light radiated from the light source 1 toward the spatial light modulator 2 and may reflect light of the second linear polarization component modulated and reflected from the spatial light modulator 2 toward a first emission side 381a. The concave reflector 382 may be located to face the first emission side 381a of the beam splitter 381 and may reflect the light toward the first emission side 381a. The ¼ wavelength plate 383 may be located between the first emission side 381a of the beam splitter 381 and the concave reflector 382. The ¼ wavelength plate 383 may convert linear polarization light into circular polarization light and the circular polarization light into the linear polarization light. The first lens 384 may be located between the beam splitter 381 and the reflector 46.

Light having the first linear polarization component of the light radiated from the light source 1 may be transmitted through the beam splitter 381 and incident into the spatial light modulator 2. When the light of the first linear polarization component that is incident into the spatial light modulator 2 is modulated and reflected by the spatial light modulator 2, the light of the first linear polarization component may become light of the second linear polarization component and may be incident into the beam splitter 381 again. The light of the second linear polarization component may be reflected by the beam splitter 381 and may be emitted toward the first emission side 381b. The light of the second linear polarization component may become light of a second circular polarization component by passing through the ¼ wavelength plate 383 and may be incident into the concave reflector 382. The light reflected by the concave reflector 382 may become light of a first circular polarization component, and the light of the first circular polarization component may become the light of the first linear polarization component by passing through the ¼ wavelength plate 383. The light of the first linear polarization component may be transmitted through the beam splitter 381 and may be incident into the reflector 46 through the first lens 384. A spatial filter configured to remove unnecessary optical components, except for the image light L1 modulated by the spatial light modulator 2, for example, a holographic image, may further be arranged between the beam splitter 381 and the first lens 384 or at an emission side of the first lens 384.

The light emitted from the light source 1 may include a divergent beam having a beam diameter which is increased in a light progression direction. The concave reflector 382 may make the light from the first emission surface 381b of the beam splitter 381 as parallel light or convergent light. The first lens 384 may make the incident light as convergent light. The first lens 384 may include a convex lens or a free-form lens. The reflector 46 may steer the image light L1 and deliver the image light L1 through the second light path LP2. The image light L1 may be incident into the first surface 451 of the HOE 45 by passing through the second lens 47. The HOE 45 may make the image light L1 together with the external light L2 incident through the second surface 452 incident into the pupil P of a viewer through the third light path LP3. The second lens 47 may make the light reflected by the reflector 46 as convergent light. The second lens 47 may include a convex lens or a free-form lens.

Figure 13A:
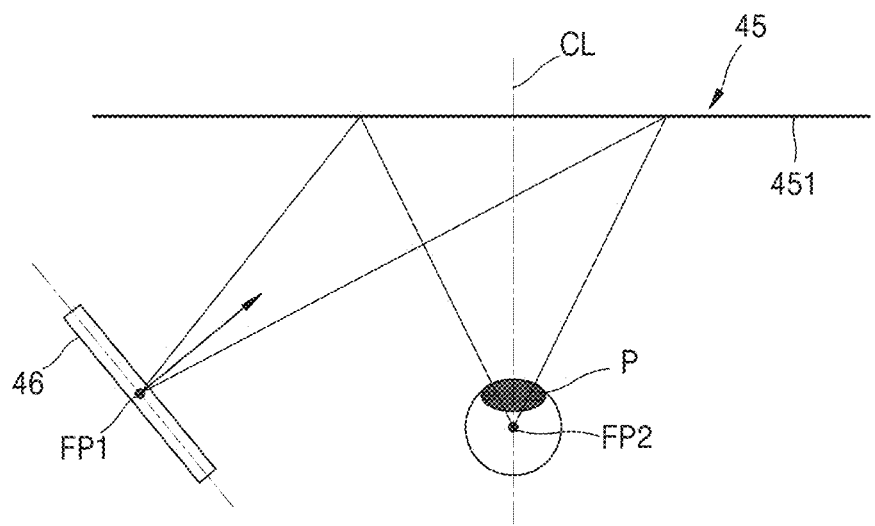
FIGS. 13A, 13B, and 13C illustrate a process in which an eye box is formed via beam steering using a reflector according to an example embodiment.
Figure 13B:
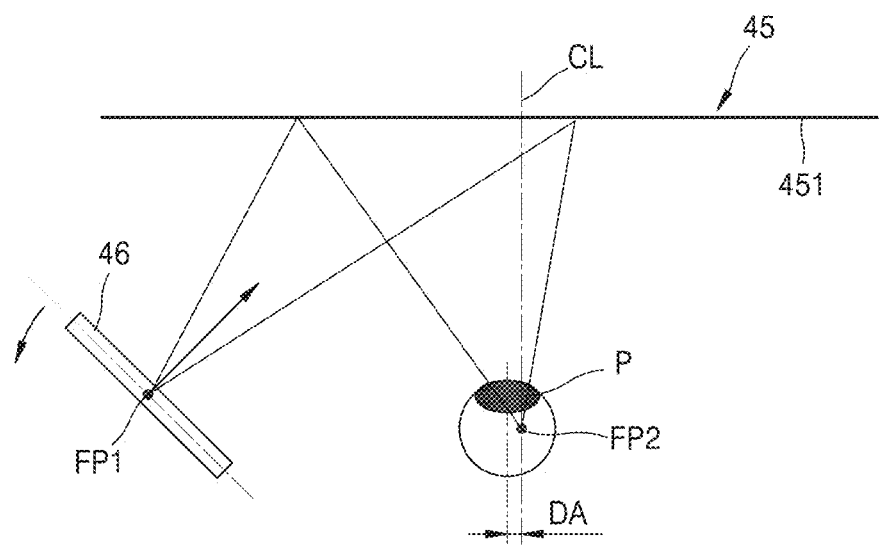
Figure 13C:
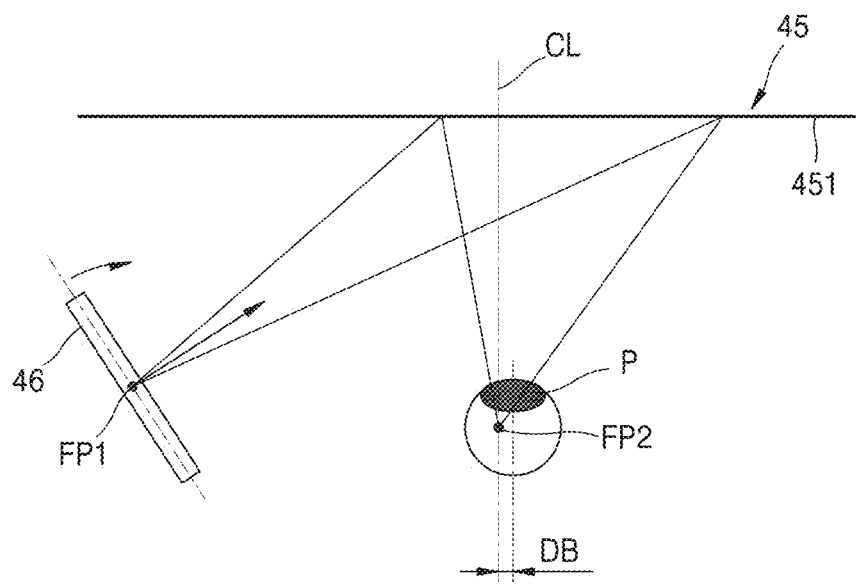

FIGS. 13A, 13B, and 13C illustrate a process in which an eye box is formed via beam steering using the reflector 46. FIG. 13 illustrates that the reflector 46 is located at a focal point FP1 of the first optical system 3, for example, at a focal point of a lens system formed by the concave reflector 382 and the first lens 384. Referring to FIG. 13, a hologram pattern configured to focus the light incident from the reflector 46 at a focusing point FP2 may be formed on the first surface 451 of the HOE 45. The pupil P may be located in front of the focal point FP2. That is, the pupil P may be located to be close to the HOE 45. A distance between the pupil P and the focusing point FP2 may be, for example, about 2 mm to about 5 mm. FIG. 13A shows a case in which the reflector 46 has a reference angle phase. The focusing point FP2 and a center of the pupil P may be aligned with a reference line CL. As illustrated in FIG. 13B, even when the reflector 46 is maximally displaced in an anti-clockwise direction, a location of the focusing point FP2 may not be changed. A location of the pupil P capable of receiving light may be widened toward a right side by a distance DA. As illustrated in FIG. 13C, even when the reflector 46 is maximally displaced in a clockwise direction, a location of the focusing point FP2 may not be changed. A location of the pupil P capable of receiving light may be widened toward a left side by a distance DB. As a result, by steering the light by using the reflector 46, an eye box of DA+DB may be obtained.

Figure 14:
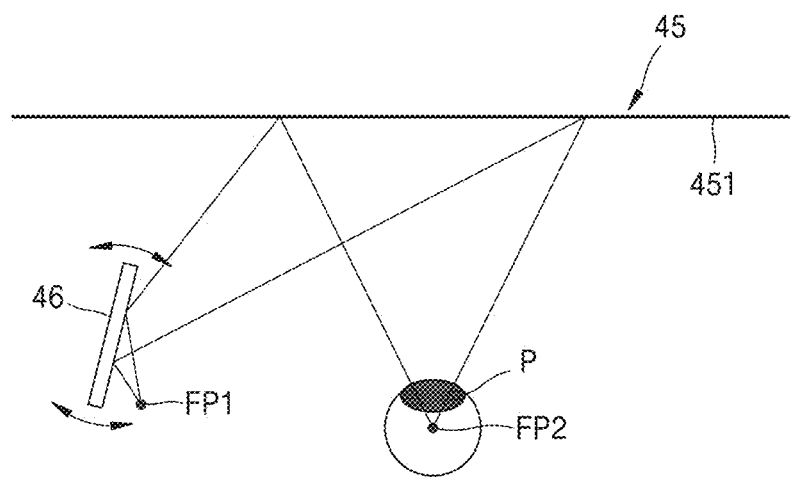
FIG. 14 illustrates a process in which an eye box is formed via beam steering using a reflector illustrated in FIGS. 11 and 12.

The reflector 46 may not necessarily have to be located at the focal point FP1 of the first optical system 3. FIG. 14 is a diagram for describing a process in which an eye box is formed via beam steering using the reflector 46. Referring to FIG. 14, the reflector 46 may be located at a downstream with respect to the focal point FP1 of the first optical system 3. For example, the reflector 46 may be located to be closer to the HOE 45 than the focal point FP1 of the first optical system 3. In this case, the light may be steered by using the reflector 46 to obtain the same effect as described with respect to FIGS. 13A through 13C. The reflector 46 may be located at an upstream with respect to the focal point FP1 of the first optical system 3. For example, the reflector 46 may be located to be farther from the HOE 45 than the focal point FP1 of the first optical system 3.

Figure 15:
FIGS. 15, 16, and 17 illustrate various electronic devices, in which a multi-image display apparatus according to example embodiments is implemented.
Figure 16:
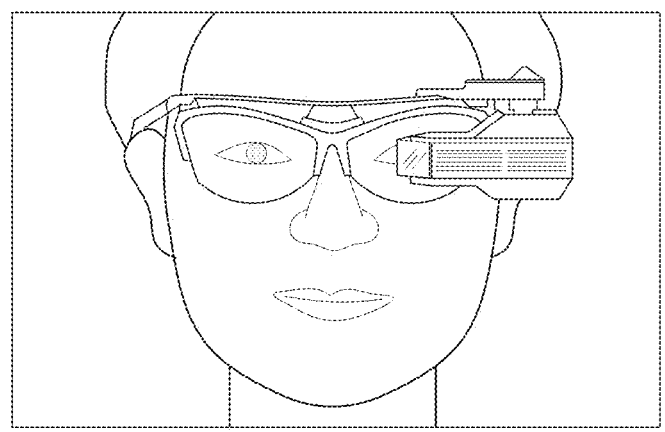
Figure 17:
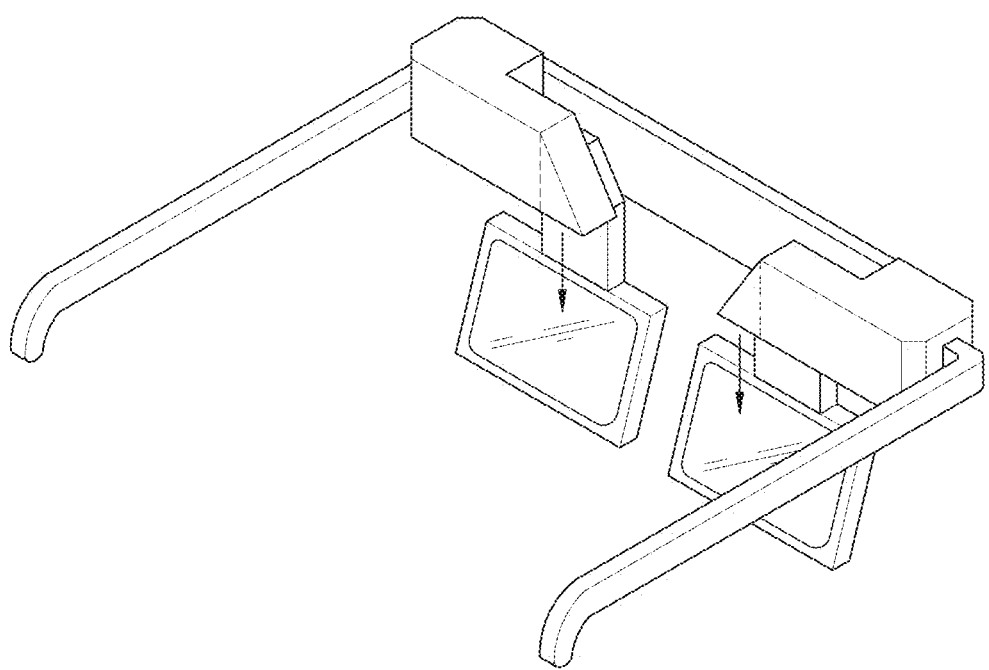

FIGS. 15 through 17 illustrate various electronic devices implementing the multi-image display apparatuses according to example embodiments. As illustrated in FIGS. 15 through 17, the multi-image display apparatus may be applied to wearable devices. For example, the multi-image display apparatus may be applied to a head mounted display (HMD). Also, the multi-image display apparatus may be applied to a glasses-type display, a goggle-type display, etc. The wearable electronic devices illustrated in FIGS. 15 through 17 may operate in synchronization with a smart phone. The multi-image display apparatus may include a head mount-type, a glasses-type, or a goggle-type VR display apparatus, AR display apparatus, or MR display apparatus, which may provide VR or a virtual image together with an external actual image.

The multi-image display apparatus may also be provided in a smart phone, and the smart phones may be directly used as the multi-image display apparatus. For example, the multi-image display apparatus may be applied in a small electronic device (a mobile electronic device), rather than the wearable devices illustrated in FIGS. 15 through 17. In addition, an application field of the multi-image display apparatus may be variously modified. For example, the multi-image display apparatus may be applied to not only to realize VR, AR, or MR, but may also be applied to other fields. For example, the multi-image display apparatus may be applied to a small television or a small monitor which may be worn by a user.

The multi-image display apparatus may provide a multi-image having a three-dimensional effect together with an actual external panorama, and thus, a more realistic AR experience may be provided. Also, the multi-image display apparatus may be realized as a compact multi-image display apparatus, in which a viewing area is increased.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. A multi-image display apparatus comprising:
  a light source configured to emit light;
  a spatial light modulator configured to modulate the light emitted by the light source and generate image light;
  a first optical system configured to deliver the image light through a first light path and a second light path that is not parallel with the first light path; and
  a second optical system configured to deliver external light and the image light delivered through the second light path to a pupil of a viewer, through a third light path that is not parallel with the second light path,
  wherein the second optical system comprises a steering optical device provided at a crossing point of the second light path and the third light path and configured to be two-axis rotated,
  wherein the steering optical device comprises a polarization beam splitter configured to reflect light having a first linear polarization component and transmit light having a second linear polarization component that is orthogonal to the first linear polarization component, and wherein the second optical system further comprises a half-transmittance reflector configured to, at a first surface, reflect the light reflected from the polarization beam splitter toward the polarization beam splitter and transmit, at a second surface opposite to the first surface, transmit the external light toward the polarization beam splitter.

2. The multi-image display apparatus of claim 1, further comprising:
a supporter configured to support a first edge of the steering optical device to be pivoted;
an elastic supporter configured to elastically support a second edge opposite to the first edge in a first direction of a first diagonal line; and
a first actuator and a second actuator respectively configured to displace a third edge and a fourth edge in a second direction of a second diagonal line crossing the first diagonal line.

3. The multi-image display apparatus of claim 1, wherein the steering optical device comprises a half-transmittance mirror configured to reflect half of incident light and transmit a remaining half of the incident light.

4. The multi-image display apparatus of claim 1,
wherein the first optical system is configured to provide the first linear polarization component of the image light to the polarization beam splitter.

5. The multi-image display apparatus of claim 4, wherein the second optical system further comprises:
a ¼ wavelength plate provided between the polarization beam splitter and the half-transmittance reflector.

6. The multi-image display apparatus of claim 5, wherein the half-transmittance reflector comprises a concave reflector.

7. The multi-image display apparatus of claim 6, wherein the first optical system is configured to form a real image of the image light between the concave reflector and a focal point of the concave reflector.

8. The multi-image display apparatus of claim 1, wherein the spatial light modulator comprises a reflective spatial light modulator configured to reflect and modulate the light emitted by the light source.

9. The multi-image display apparatus of claim 8, wherein the first optical system comprises:
a first beam splitter configured to reflect the first linear polarization component of the light emitted by the light source toward the spatial light modulator and transmit the light of the second linear polarization component modulated and reflected from the spatial light modulator;
a second beam splitter provided at a first emission side of the first beam splitter, the second beam splitter being configured to reflect the light of the first linear polarization component toward the second light path and transmit the light of the second linear polarization component;
a reflector configured to reflect the light transmitted through the second beam splitter toward the second beam splitter; and
a ¼ wavelength plate provided between the second beam splitter and the reflector.

10. The multi-image display apparatus of claim 1, wherein the spatial light modulator includes a transmissive spatial light modulator configured to transmit and modulate the light emitted by the light source.

11. The multi-image display apparatus of claim 10, wherein the first optical system further comprises:
a second beam splitter configured to reflect the light of the first linear polarization component of the image light emitted by the spatial light modulator toward the second light path and transmit the light of the second linear polarization component;
a reflector configured to reflect the light transmitted through the second beam splitter toward the second beam splitter; and
a ¼ wavelength plate provided between the second beam splitter and the reflector.

12. The multi-image display apparatus of claim 11, wherein the first optical system further comprises:
a first lens and a second lens provided between the spatial light modulator and the second beam splitter;
a spatial filter provided between the first lens and the second lens; and
a third lens provided at an emission side of the second beam splitter, and
wherein the first lens and the second lens comprise convex lenses and the third lens comprises a concave lens.

13. The multi-image display apparatus of claim 1, wherein the first optical system and the second optical system are configured to form a Maxwellian view optical system in which image information is focused at one point in the pupil and is emitted onto a retina of the viewer.

14. A multi-image display apparatus comprising:
a light source configured to emit light;
a spatial light modulator configured to modulate the light emitted by the light source and generate image light;
a first optical system configured to deliver the image light through a first light path and a second light path that is not parallel with the first light path; and
a second optical system configured to deliver external light and the image light delivered through the second light path to a pupil of a viewer, through a third light path that is not parallel with the second light path,
wherein the second optical system comprises a steering optical device provided at a crossing point of the second light path and the third light path and configured to be two-axis rotated, and
wherein the first optical system further comprises:
a first beam splitter configured to reflect a first linear polarization component of the light emitted by the light source toward the spatial light modulator and transmit light of a second linear polarization component modulated and reflected from the spatial light modulator;
a second beam splitter provided at a first emission side of the first beam splitter, the second beam splitter being configured to reflect the light of the first linear polarization component toward the second light path and transmit the light of the second linear polarization component;
a first lens provided between the spatial light modulator and the first beam splitter;
a second lens provided between the first beam splitter and the second beam splitter; and
a third lens provided at a second emission side of the second beam splitter.

15. The multi-image display apparatus of claim 14, wherein the first optical system further comprises a spatial filter provided adjacent to a focal point of the first lens between the first beam splitter and the second beam splitter.

16. The multi-image display apparatus of claim 14, wherein the first lens and the second lens comprise convex lenses and the third lens comprises a concave lens.

\* \* \* \* \*